US012348100B2

(12) United States Patent
Katzenberger et al.

(10) Patent No.: US 12,348,100 B2
(45) Date of Patent: Jul. 1, 2025

(54) DEVICE FOR VOLTAGE EQUALIZATION IN SQUARE WAVE VOLTAGES FOR AN ELECTRIC MOTOR

(71) Applicant: Innomotics GmbH, Nuremberg (DE)

(72) Inventors: Tobias Katzenberger, Bad Königshofen STT Untereßfeld (DE); Bastian Plochmann, Neustadt an der Aisch (DE)

(73) Assignee: INNOMOTICS GMBH, Nuremberg (DE)

( * ) Notice: Subject to any disclaimer, the term of this patent is extended or adjusted under 35 U.S.C. 154(b) by 442 days.

(21) Appl. No.: 17/774,320

(22) PCT Filed: Oct. 9, 2020

(86) PCT No.: PCT/EP2020/078457
§ 371 (c)(1),
(2) Date: May 4, 2022

(87) PCT Pub. No.: WO2021/089271
PCT Pub. Date: May 14, 2021

(65) Prior Publication Data
US 2022/0393537 A1 Dec. 8, 2022

(30) Foreign Application Priority Data

Nov. 5, 2019 (EP) .................................... 19207121

(51) Int. Cl.
*H02K 3/30* (2006.01)
*C09D 5/24* (2006.01)
(Continued)

(52) U.S. Cl.
CPC ................ *H02K 3/30* (2013.01); *C09D 5/24* (2013.01); *C09D 7/62* (2018.01); *C09D 7/67* (2018.01);
(Continued)

(58) Field of Classification Search
CPC ........ C08K 2201/001; C08K 2201/005; C08K 2201/011; C08K 9/00; C09D 5/24;
(Continued)

(56) References Cited

U.S. PATENT DOCUMENTS 8,105,964 B2 * 1/2012 Cawse ........................ C08J 5/06
442/72
9,208,931 B2 * 12/2015 Kosowsky ............... H01B 1/20
(Continued)

FOREIGN PATENT DOCUMENTS

CN 103 036 485 4/2013 ................ H02P 1/20
DE 102017109049 A1 10/2018 ................ G01D 5/14
(Continued)

OTHER PUBLICATIONS

Chen, Zhong, et al, "Fundamentals of Electromagnetics Theory in this art," Beijing Institute of Technology Press, 15 pages (Chinese w/ English translation), Feb. 28, 2003.
(Continued)

*Primary Examiner* — Alex W Mok
(74) *Attorney, Agent, or Firm* — Slayden Grubert Beard PLLC

(57) ABSTRACT

Various embodiments of the teachings herein include an apparatus for voltage equalization in square-wave voltages of electric motors. The apparatus may include: a terminal board circuit wherein phases U, V, and W each comprises input and output cabled conductors summing to at least 6 cables; and a bridge between two of the at least six cables connecting two or more of the at least 6 cable inputs and outputs. The bridge is partially conductive such that its electrical resistance markedly reduces above a threshold value. The partial conductivity results from filler particles in an embedding matrix determining a reduction of the resistance in the bridge above the threshold value.

15 Claims, 4 Drawing Sheets

(51) Int. Cl.
  *C09D 7/40* (2018.01)
  *C09D 7/62* (2018.01)
  *C08K 9/00* (2006.01)

(52) U.S. Cl.
  CPC .................. *C09D 7/68* (2018.01); *C08K 9/00* (2013.01); *C08K 2201/001* (2013.01); *C08K 2201/005* (2013.01); *C08K 2201/011* (2013.01)

(58) Field of Classification Search
  CPC ... C09D 7/62; C09D 7/67; C09D 7/68; H01C 17/06526; H01C 17/0658; H01C 17/06586; H01C 7/105; H02K 11/26; H02K 3/30
  USPC ...................................................... 310/68 R
  See application file for complete search history.

(56) References Cited

U.S. PATENT DOCUMENTS

| | | | |
|---|---|---|---|
| 9,424,967 B2 * | 8/2016 | Gröppel | ................... H01C 7/10 |
| 10,254,499 B1 * | 4/2019 | Cohen | ................... B29C 64/321 |
| 2022/0393537 A1 | 12/2022 | Katzenberger et al. | |

FOREIGN PATENT DOCUMENTS

| | | | |
|---|---|---|---|
| EP | 0 977 337 | 3/2011 | ............... H02H 7/12 |
| WO | 2011/149989 A1 | 12/2011 | ............. H01L 21/28 |
| WO | 2021/089271 A1 | 5/2021 | ............... H01C 7/10 |

OTHER PUBLICATIONS

Fang, Qianfeng, et al., "The Basic Principle and Applications of Internal Friction and Mechanical Spectroscopy in this Art," Shanghai Jiao Tong University Press, 16 pages (Chinese w/ English translation), Aug. 31, 2014.
Chinese Office Action, Application No. 202080087081.7, 7 pages, Apr. 18, 2024.
Search Report for International Application No. PCT/EP2020/078457, 15 pages., Apr. 1, 2021.
Extended European Search Report, Application No. 19207121.5, 10 pages, Aug. 4, 2020.
Indian Office Action, Application No. 202217025942, 6 pages, Sep. 8, 2022.
Chinese Office Action, Application No. 202080087081.7, 16 pages, Jul. 22, 2023.
Chinese Office Action, Application No. 202080087081.7, 15 pages, Jul. 12, 2024.

* cited by examiner

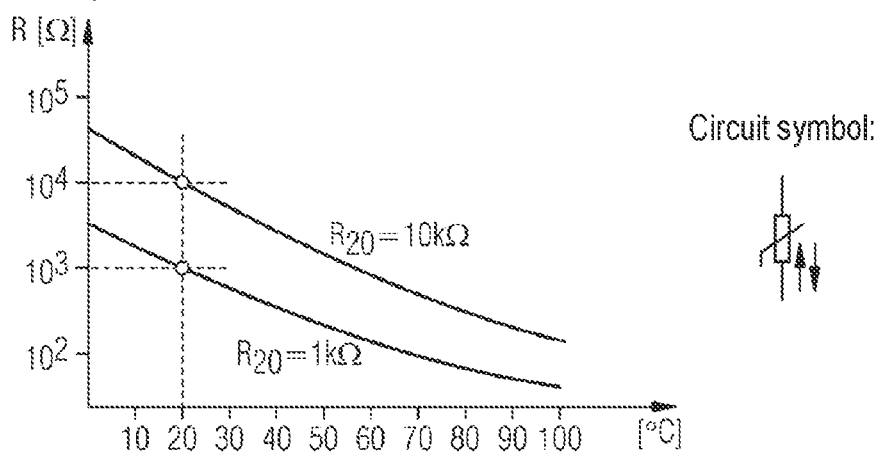
Image 7-69: Characteristic curve and circuit symbol of an NTC resistor
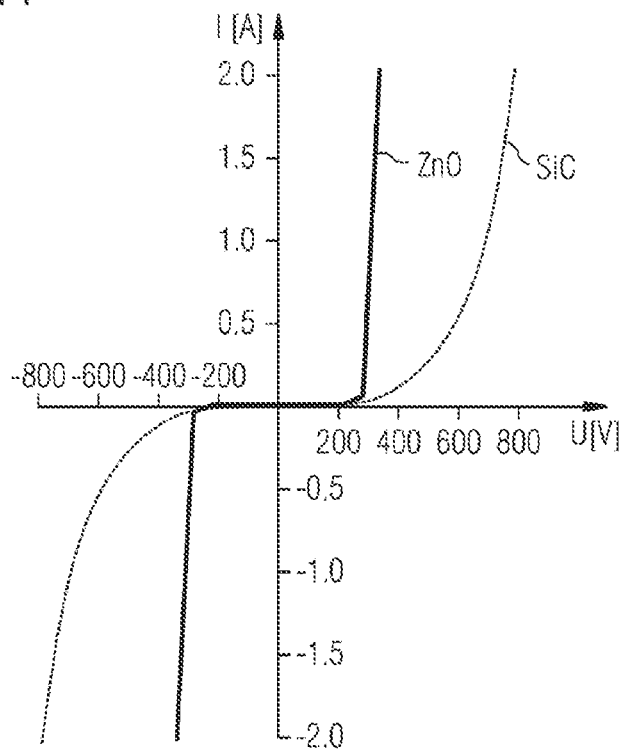
Figure 7: U-I characteristic curve of varistor/EGS materials (SnO2)

DEVICE FOR VOLTAGE EQUALIZATION IN SQUARE WAVE VOLTAGES FOR AN ELECTRIC MOTOR

CROSS-REFERENCE TO RELATED APPLICATIONS

This application is a U.S. National Stage Application of International Application No. PCT/EP2020/078457 filed Oct. 9, 2020, which designates the United States of America, and claims priority to EP Application No. 19207121.5 filed Nov. 5, 2019, the contents of which are hereby incorporated by reference in their entirety.

TECHNICAL FIELD

The present disclosure relates to electric motors. Various embodiments of the teachings herein include apparatuses for voltage equalization in square-wave voltages, in particular in a terminal board circuit connected upstream of a random winding of conductors in a slot of an electric motor.

BACKGROUND

Low-voltage motors, e.g., motors having a voltage up to 1000 V "direct-on-line" DOL and/or 690 V "variable speed drive" VSD, are equipped with the so-called partial discharge-free insulation system which meets the motor standard IEC 60034-18-41. This is especially an insulation which comprises a wire lacquer on the conductor, for example in a film thickness of about 200 μm and—and in turn for example—in a multilayer construction, for example with polyimides such as polyamideimide PAI.

The conductor coated in this way is inserted into a slot of an electric motor, in particular in the form of a so-called "jumble winding", e.g. a random winding in which the wire of the 90th winding can end up adjacent to the wire of the first winding. The slot generally contains a so-called slot liner as the main insulation, which in its standard form is a type of U-shaped folded paper. The paper generally has a carrier which has an insulating coating on both sides, in particular has an insulating coating comprising a composite material containing reinforcing fibers. This is for example the commercially available material NOMEX which may, for example, also be joined to the carrier of the paper slot via an adhesive layer. The carrier is for example a plastic film, for example a PET film. The thickness of the film is for example in the range of 200 μm. In the course of manufacture of electric motors the slot liners are initially "injected" into the slots of the metal package. The pre-wound conductor wire winding is then drawn in mechanically.

In the region of the end winding the windings of the respective phases are separated from one another by insert papers—these papers generally have the same material construction as the slot liners described above. Once the end windings have been formed and bandaged these are embedded in a resin matrix to complete the insulation. What is employed here is for example an impregnation with an impregnating medium, which generally comprises a liquid resin such as an epoxy resin, polyetherimide—PEI—resin or the like, PEI cold-dipping, hot-dipping and/or drizzling of the liquid resin and subsequent curing. Impregnation ensures that the wire interspaces, the spaces in front of and behind the slot liners and the geometric spaces in the end windings are at least partially filled with impregnating resin. The impregnating resin ensures mechanical fixing of and heat removal from the conductor winding but, as a dielectric material, also serves as insulation.

The conductor is thus insulated by wire lacquer, impregnation, slot liner and further impregnation. The insulation system may be considered in simplified electrical terms as a capacitor comprising different dielectric materials, wherein the electric field lines are always displaced into regions of low epsilon, which, in case of doubt, are always air-filled pores and/or an incompletely cured resin region in the impregnating medium. Such an insulation system meets the requirements in terms of operating voltage very well, in particular in respect of dielectric strength, insulation resistance and loss factor. The system can moreover be mass-produced in simple and cost-effective fashion.

However, technical development has shown that these electric motors are increasingly operated with and connected to an inverter, thus leading to sharp switching operations which generate square-wave voltages with substantially higher voltage peaks with rising edges of up to 150 ns. In terms of insulation, marked voltage overshoots therefore occur during the switching operation. An "inverter" is in particular an alternating current inverter whose inversion of a sinewave via frequency control into a square-wave voltage is used in the direct supply and control of the speed of an electrical machine such as a three-phase motor in the context of electric propulsion technology.

A square wave is a periodic signal which switches back and forth between two values and exhibits a square profile against time in a diagram. An ideal square profile exists only in theory. In reality, edges cannot rise vertically and thus perform an infinitely steep jump—the real jump by contrast is described by the rise and fall times. As a result, inter alia, of the capacitive and inductive behavior of the transmission lines a square-wave signal generally exhibits undershooting and overshooting. While undershooting is insignificant for the insulation, overshooting can lead to voltage peaks which leads to partial discharges which in turn lead to decomposition of the insulation.

The reason for this is that in electrical engineering terms overshoots produce a sharp edge through superposition of very high frequencies in the range of for example 1 kHz to 1 MHz. FIG. 1 shows a square-wave voltage of an inverter with overshoots in the edge region. The uninterrupted line 1 shows the voltage profile with the target voltage and the overshoot of the square-wave voltage, wherein tr remains constant, the voltage Upk is however markedly above the partial discharge onset voltage but, despite this, partial discharge is not apparent.

The square-wave voltage for example proceeds such that 1000 volts alternate with 0 volts, wherein the sine waves are superimposed by Fourier transformation to form the square waves. The dashed line 2 shows the voltage maxima of the sine waves.

FIG. 2 shows the profile of the overshooting voltage in the edge region of the inverter in detail. The described and depicted voltages often exceed the partial discharge onset voltage in the insulation system, for example wire-wire, which exists as a result of pores, cavities and material changes and accompanying different epsilon at weak points thus resulting via the Paschen minimum to onset of partial discharges. These partial discharges continue to occur during inverter operation and are further amplified by the progressive erosion of the embedding plastic, thus resulting relatively quickly in failure of the insulation system and thus in motor damage.

FIG. 3 shows the frequency superposition of a square-wave voltage such as is typical for the above-described scenario. The resulting partial discharge problem becomes apparent—for example—in the end winding between two critical wires which are in contact due to the jumble winding. Partial discharges occur if the partial discharge onset voltage thereof, which results substantially from the wire insulation of the two wires, the impregnation resin, the curing thereof and optionally pores filled with air, is exceeded. These discharges bring about—in the worst case at every inverter impulse—an oxidation, i.e. decomposition of the impregnating resin and optionally also of the wire lacquer. This can lead to complete discharging via a dielectric breakdown. This results in a short circuit between the affected windings of the jumble winding. Consequently, the short circuit current causes the temperature to markedly increase at this point until the affected wires "burn out". The motor current therefore becomes asymmetrical and the winding burns out completely or else the inverter recognizes the asymmetry and switches off. In both cases the motor is defective and irreparable.

A very high-quality impregnation which brings about a virtually 100% filling of the wire/slot liner interspaces would solve the problem but this is associated either with a substantially costlier impregnating medium and/or more laborious and thus more costly impregnation process.

SUMMARY

The teachings of the present disclosure may be used to provide a cost-efficient, effective protection from damage to the motor and/or the insulation through partial discharges due to overshoots in operation of an electrical machine using an inverter. For example, some embodiments include an apparatus for voltage equalization in square-wave voltages of electric motors having a terminal board circuit, wherein in the terminal board circuit the phases U, V and W are each in the form of input and output cabled conductors which sum to at least 6 cables and at least one bridge between at least two cables which connects two or more of the at least 6 cable inputs and outputs is provided, wherein the bridge is partially conductive such that its electrical resistance markedly reduces above a threshold value, wherein the partial conductivity is based on filler particles in an embedding matrix which have a determining influence on the reduction of the resistance in the bridge above the threshold value.

In some embodiments, the filler particles are embedded in a polymeric and/or ceramic matrix.

In some embodiments, at least some of the filler particles have a partially conductive coating.

In some embodiments, the partially conductive coating of the filler particles is doped.

In some embodiments, the thickness of the partially conductive coating of the filler particles is in the range from 10 nm to 100 nm.

In some embodiments, at least one fraction of the filler particles comprises hollow filler particles having a partially conductive coating, as described herein.

In some embodiments, a substrate made of wood, pressboard, plastic, in particular of epoxy resin and/or polysiloxane, of thermoplastic, such as PEEK, PA, PE, PET, PBT, of fiber-reinforced plastic, of ceramic and/or leather, which carries the embedding matrix including filler particles, is present.

In some embodiments, the embedding matrix forms a lacquer with the filler particles.

In some embodiments, the lacquer comprises a resin or a resin mixture comprising one of the compounds epoxy resin, polyetherimide, polysiloxane, polysilazane, alone or in any desired combination.

In some embodiments, the lacquer is applied to the substrate in a film thickness in the range between 10 µm and 3 mm.

In some embodiments, the filler particles are made of a metal oxide, metal carbide and/or a metal nitride, form a mixture of these metal compounds and/or comprise a mixed metal compound.

In some embodiments, the filler particles form an oxide and/or a carbide with at least one of the following elements or else two or more elements together: tin, zinc, iron, molybdenum, bismuth, lead, chromium, manganese, nickel, cobalt, titanium, vanadium, indium, zirconium, tungsten, silicon, antimony, tellurium, germanium.

In some embodiments, the filler particles are present in the embedding matrix in a concentration of 0.5% by volume to 30% by volume.

In some embodiments, the size of the filler particles is in the range from 500 nm to 50 µm.

In some embodiments, the filler is in the form of two or more filler fractions.

BRIEF DESCRIPTION OF THE DRAWINGS

FIGS. 6, 7 and 8 show in detail how the drop in resistance can be explained by short-term high voltages within the lacquer which is part of the apparatus 3 for voltage reduction.

DETAILED DESCRIPTION

Figure 1:
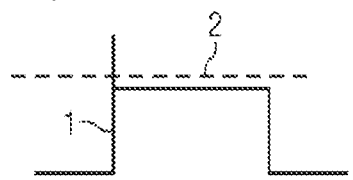
FIG. 1 shows a square-wave voltage of a prior art inverter with overshoots in the edge region.

The present disclosure describes, among other embodiments, an apparatus for voltage equalization in square-wave voltages of electric motors having a terminal board circuit, wherein in the terminal board circuit the phases U, V and W are each in the form of input and output cabled conductors which sum to at least 6 cables and at least one bridge between at least two cables which connects two or more of the at least 6 cable inputs and outputs is provided, wherein the bridge is partially conductive such that its electrical resistance markedly reduces above a threshold value, wherein the partial conductivity is based on filler particles in an embedding matrix which have a determining influence on the reduction of the resistance in the bridge above the threshold value.

In some embodiments, bridging of at least two phases of a terminal board circuit of an electric motor can protect said motor, during operation using an inverter, from the dielectric breakdown of partial discharges which are unavoidable in square-wave voltages in that partial discharges occurring are diverted to ground by the bridge and therefore do not reach and do not harm the electric motor itself. The service life of the electric motors operated with an inverter can therefore be increased many times over. The composite material of the bridge shows a high resistance at low voltages but at high voltages, such as occur during partial discharges as a result of the nonlinear behavior of the particle resistance, shows a low resistance and becomes sufficiently conductive for a galvanic bridge to be formed between two or more cables which intercepts and diverts the high voltage of a partial discharge before it encounters the insulation and/or the motor.

A "threshold value" refers to a value characteristic for the respective material. This will naturally need to be defined separately for each material and/or each application in terms of frequency, voltage and/or field strength since it is a function of the material, its application, the carrier and other environmental factors.

The bridge comprises for example a carrier, generally an insulating substrate, such as a circuit board which is for example made of a fiber-reinforced plastic, in particular of epoxy resin and/or polysiloxane, of thermoplastic, such as polyether ether ketone—PEEK—, polyamide—PA—, polyethylene—PE—, polyethylene terephthalate—PET—, polybutylene terephthalate—PBT—, but also wood, pressboard, plastic, of ceramic and/or leather.

Reinforcing fibers employed include for example glass fibers, carbon fibers, ceramic fibers and/or aramid fibers.

This substrate itself may be part of the embedding matrix and/or form said matrix entirely.

The bridge may result from a surface coating of an electrically insulating substrate lacking intrinsic surface conductivity with a partially conductive lacquer containing filler particles which provide the lacquer and the surface coated therewith with the desired, voltage-dependent electrical conductivity.

In some embodiments, the filler may be incorporated into a plastic that may be used without a substrate or the filler may also be incorporated into a ceramic matrix. In some embodiments, the partially conductive composite material is a simple coating by—for example—spraying of a substrate with a partially conductive lacquer.

In some embodiments, the embedding matrix of the lacquer cures into a polymer. To form the composite material which forms the bridge, for example of a partially conductive lacquer, the embedding matrix may be organic-based and not ceramic, for example a thermosetting resin or a thermosetting resin mixture. Employed here are for example compounds which form polymers such as epoxy, polyetherimide—PEI—, polysiloxane, polysilazane, in each case with or without solvent as desired.

In some embodiments, instead of an embedding polymer matrix, there is a ceramic sintering layer which may be utilized for mechanical fixing of the partially conductive filler particles to form the composite material forming the bridge.

Application of the lacquer to the substrate may be carried out as desired according to customary methods such as for example film application by spraying, doctor blade coating, spin-coating, dip-coating and/or brushing.

In some embodiments, the film thicknesses of the lacquer are between 20 µm to 1 mm, e.g. between 50 µm and 200 µm, in each case also as a consequence of the application method employed. The lower limit of the thickness of the lacquer is the particle size of the largest filler particle fraction. The upper limit is influenced by the mechanical stability of the lacquer, influenced by evaporation of the solvent, if present, by cracking in the lacquer and similar parameters.

In some embodiments, the lacquer coating on the substrate is in a thickness of 10 µm to several millimeters in the single-figure range. For example the lacquer may be present in a thickness of 10 µm to 3 mm, in particular of 15 µm to 2 mm, and/or in the range of 20 µm to 1 mm.

In some embodiments, the filler may be monomodal, i.e. be in the form of one filler fraction, but may comprise two or more filler fractions and is therefore in bimodal or multimodal form. The individual filler fractions may differ in terms of material, size, shape, structure and surface constitution. The sum of all filler fractions together forms the filler content which is preferably above the percolation threshold but—depending on the partial conductivity properties of the filler particles—may also be therebelow. The filler particles may be solid or hollow, coated, partially coated and/or uncoated. The filler particles may be embedded in a polymeric matrix.

In some embodiments, the polymeric matrix comprising the filler particles and optionally solvent is in a form such that it is sprayable.

In some embodiments, the filler content is generally not more than 30% by volume, wherein in the case of filler particle properties in terms of their varistor properties sufficient partial conductivity of the lacquer may be produced by the filler particles even at very low filler contents such as less than 1% by volume and concentrations as low as 0.5% by volume.

In the case of the most commonly used ceramic fillers, for example tin oxide, iron oxide, zinc oxide, chromium oxide, manganese oxide, molybdenum oxide, bismuth oxide and/or silicon carbide the filler is generally present in the lacquer in a range from 20% by volume to 30% by volume.

In the case of carrier particles, such as hollow glass particles having a doped coating, the desired varistor properties in the lacquer may also be produced at substantially lower filler amounts, for example in the range from 0.5% by volume to 5% by volume, in particular in the range 1% by volume to 10% by volume.

The particle sizes for grains in the form of particles, in globular form, in shard-like form or without a particular shape so that the manufacturer reports an average particle size determined for example by SEM micrographs of the filler fractions, are in the range from 500 nm to 50 µm, in particular in the range from 2 µm to 20 µm. A mixture of different particle size fractions leads to improved processing properties of the lacquer.

Examples include:
3 size fractions of
0.5 µm, 10 µm and 50 µm
700 nm, 1 µm and 14 µm
0.6 µm, 15 µm and 47 µm
800 nm, 12 µm and 45 µm
0.8 µm, 11 µm and 43 µm
4 size fractions
800 nm, 8 µm, 17 µm and 45 µm or
700 nm, 11 µm, 23 µm and 40 µm These and similar combinations, especially in the above-mentioned size ranges, result in relatively low processing viscosity, i.e. better processability and a lower percolation threshold.

Regarding the material: the filler particles may comprise a ceramic material, in particular a metal oxide or a metal carbide, such as silicon carbide and/or a metal nitride. For example silicon carbide and/or tin oxide may be present in different particle size fractions. The filler fractions can differ in that they comprise coated filler particles as well as uncoated filler particles. Uncoated filler particles may have a solid structure while coated filler particles may also be hollow—they then serve as a form factor.

The solid, optionally also coated filler particles are for example made of a metal oxide, metal carbide and/or a metal nitride, but may also form a mixture of these metal compound and/or comprise a mixed metal compound. Examples of a solid filler having a coating is a filler in platelet form having a high aspect ratio, in particular having dimensions of 7 μm in diameter and 300 nm in thickness, which has a 50 nm—thick coating of tin oxide—SnO2—which is in turn antimony-doped.

A mixed metal compound is a mixed metal oxide, for example a stannate and/or a titanate. However, it is also possible to use mixtures comprising tin oxide, zinc oxide, iron oxide, titanium oxide, manganese oxide and bismuth oxide. In the dopants of the coatings of the filler particles it is especially the n-conducting dopants that are known but the mixed metal compounds may advantageously also employ p-dopants in the coating.

The filler particles are for example metal oxide transition metal compounds comprising tin, chromium, molybdenum, iron and zinc. The filler particles preferably form an oxide or a carbide with at least one of the following elements and in some cases two or more elements may together form an oxide: tin, zinc, iron, molybdenum, bismuth, lead, chromium, manganese, nickel, cobalt, titanium, vanadium, indium, zirconium, tungsten, silicon, antimony, tellurium, germanium.

Filler fractions comprising filler particles which include a cavity—to form a form factor—are for example mica, glass, carbon, for example carbon nanotubes—CNTs—or other ceramics. These have a partially conductive coating, for example composed of a metal oxide tin oxide, bismuth oxide, titanium oxide and/or comprising silicon carbide. A partially conductive coating is equally possible for solid filler particles and for hollow filler particles.

In some embodiments, the partially conductive coating of the filler particles is doped, in particular n-doped, for example with elements such as halogen, pseudohalogen, in particular iodine, antimony, fluorine. The dopant amount is for example in the range of up to 5 mol %, in particular 1 mol % to 3 mol %.

The coating on the filler particles for example has a film thickness in the range between 10 nm to 100 nm, in particular between 15 nm and 80 nm, in particular between 20 nm and 70 nm.

Figure 4:
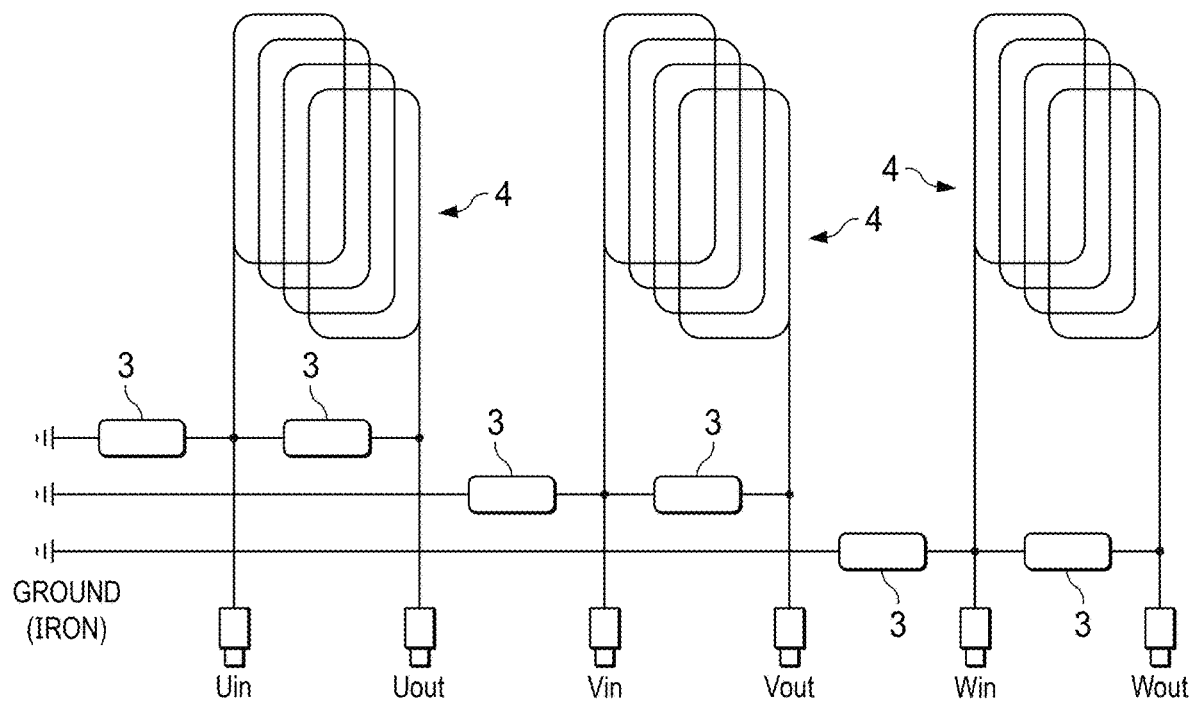
FIG. 4 shows in an exemplary and schematic manner the effect of an apparatus incorporating teachings of the present disclosure for voltage equalization in square-wave voltages of electric motors having a terminal board circuit.

FIG. 4 shows in an exemplary and schematic manner the effect of an apparatus incorporating teachings of the present disclosure for voltage equalization in square-wave voltages of electric motors having a terminal board circuit. The electrically partially conductive apparatus is introduced into the terminal board circuit such that via the contacting apparatus forming—at high voltages such as occur during partial discharges—an electrical bridge in each case the start and the end of the phases U, V and W are short-circuited and each phase is short-circuited with ground.

FIG. 4 shows a set of idealized windings 4 which form the individual phases U, V, and W. In each case, the respective two ends (e.g., Uin and Uout) are realized for example via cable connections as shown. A bridge 3 for voltage equalization may be connected between Uin and Uout in the terminal box as shown, so that in the case of a high voltage there exists an electrical connection between Uout, Uin and ground which, however, shows no conductivity in the case of normal voltage of the motor. Further, additional instances of the bridge 3 may be connected between Vin and Vout and between Win and Wout.

Figure 5:
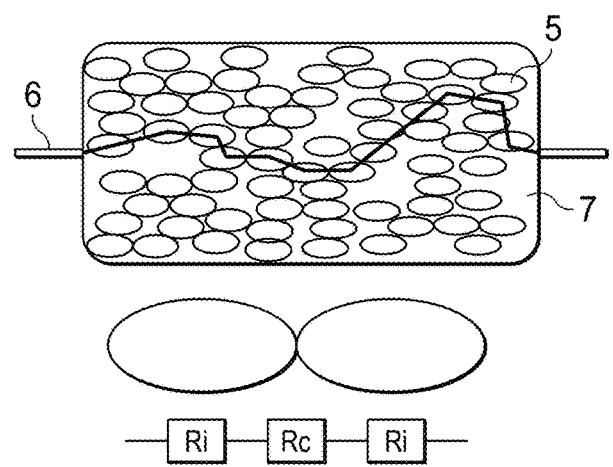
FIG. 5 shows the structure of the lacquer of the apparatus 3 from FIG. 4, an apparatus for voltage equalization incorporating teachings of the present disclosure, in particular the profile of electrical conductivity within the lacquer, in detail.

FIG. 5 shows the structure of the lacquer of the bridge 3 from FIG. 4 in particular the profile of electrical conductivity within the lacquer, in detail. It shows the embedding polymer matrix 7 forming a lacquer in which a filler fraction 5, which comprises many typically adjacent individual filler particles 5, is embedded. As mentioned above, the filler 5 may comprise two or more filler fractions which would differ in terms of the shape and size of the filler particles shown here in the figure. However, for the sake of simplicity, only one filler particle fraction 5 composed of identical filler particles 5 is shown.

Also shown here is the conductivity path 6 formed at high voltages because the internal resistance Ri of the individual filler particles 5 and the resistance Rc between individual, optionally but not necessarily, adjacent filler particles 5 falls drastically. The filler particles 5 are selected so as to produce fairest are properties in the lacquer 7, so that the lacquer 7 is electrically nonconductive at the normal operating voltages of the electric motor but shows good electrical conductivity above a threshold value, for example a threshold voltage, which differs depending on the lacquer 7. The conductivity path 6 then forms within the lacquer 7 of the bridge 3, as shown in FIG. 5.

The conductivity path 6 formed diverts the high voltage without it flowing through the idealized winding, as shown in FIG. 4, or the electric motor. This efficiently and effectively protects the electric motor from damage via partial discharges such as otherwise occur in inverter-operated electric motors.

Figure 8:
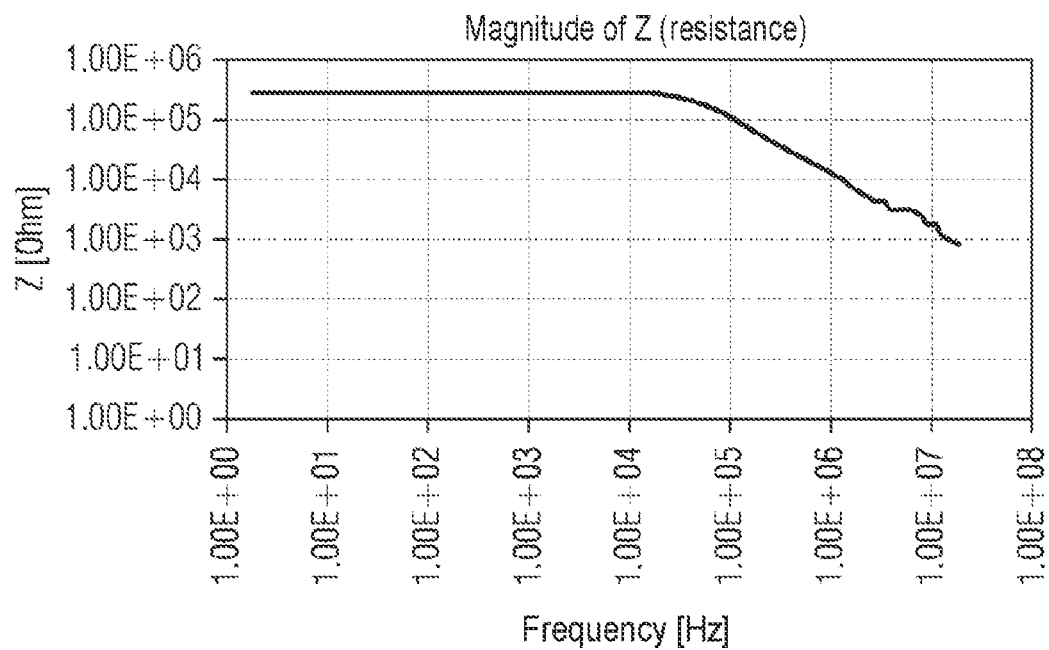

FIGS. 6, 7 and 8 show in detail how the drop in resistance can be explained by short-term high voltages within the lacquer which is part of the apparatus 3 for voltage reduction. The resistance of the particle network 5 from FIG. 5 is dominated by the Ri—grain—and/or Rc—particle—transition resistances which can be bridged by elevated voltages and/or field strengths and by elevated frequencies. There is accordingly a marked reduction in resistance with increasing voltage and/or frequency.

The purpose of the particulate network of the filler particles is the formation of a network of many small capacitors and varistors which are controlled by field strength and frequency. The embedding polymer matrix of the lacquer layer is only a mechanical fixing similar to sintered semiconductor ceramics.

Figure 2:
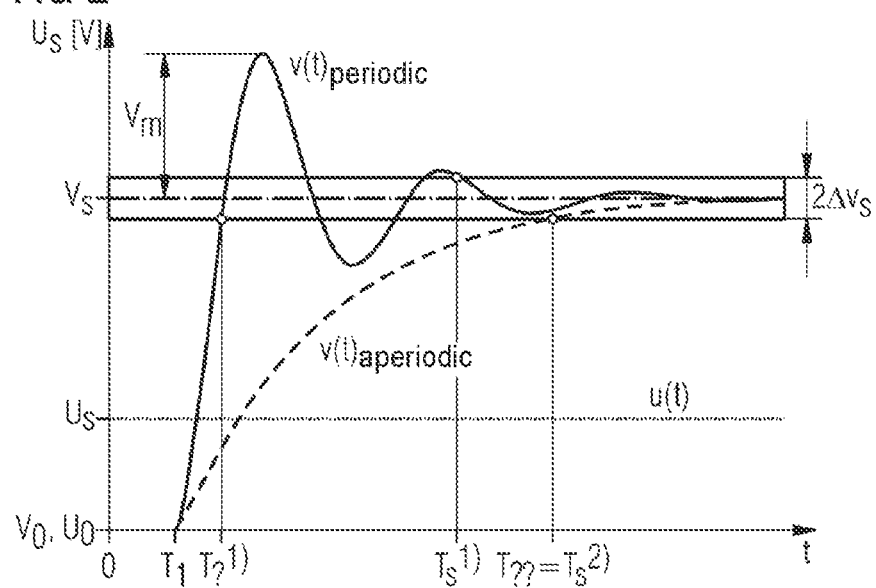
FIG. 2 shows the profile of the overshooting voltage in the edge region of the inverter from FIG. 1 in detail.
Figure 3:
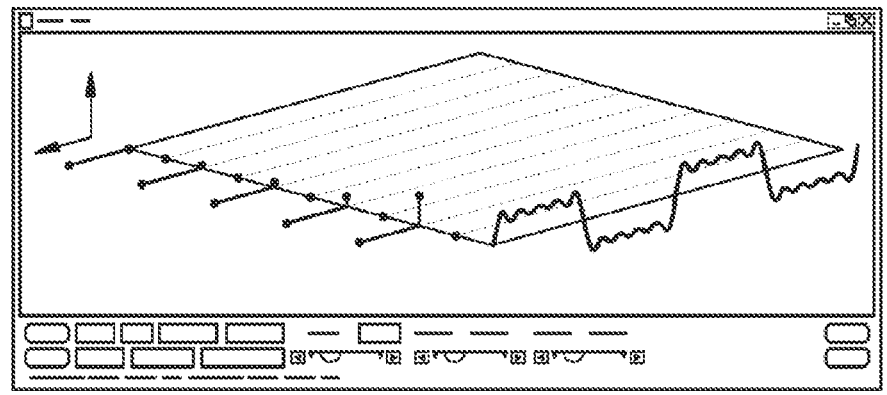
FIG. 3 shows the frequency superposition of a square-wave voltage such as is typical for the above-described scenario.

Since overshoots having very high frequencies, i.e. for example having frequencies greater than 1 kHz, coupled with voltages many times higher than the actual voltage arrive in the region of the inverter switching operation as shown in FIGS. 1 to 3, the lacquer becomes markedly more conductive than for the low frequency proportions at lower voltage as a result of the varistor effect, as shown in FIG. 7, and the effect of frequency dependent resistance, as shown in FIG. 8. The overshoot having a markedly elevated frequency and higher voltage shown in FIGS. 1 to 3 is thus partially or completely diverted, and thus weakened by this extent, through the apparatus for voltage equalization 3 which is "low-ohmic" in this region, with the result that that the critical partial discharge onset voltage is no longer achieved, thus providing protection against inverter-dependent partial discharges.

Selection of the filler fractions in terms of material, coating, doping, filler particle size distribution and shapes and the filler particle mass concentration in the lacquer makes it possible to adjust the direct current voltage resistance at room temperature as well as the "alpha" value, i.e. the gradient in the U-I diagram in a double logarithmic plot, such that only very low power losses and/or loss currents, if any, arise as a result of the apparatus for voltage equalization 3. Under normal conditions the resistance of the apparatus 3 is for example 3 to 4 decades higher than that of the conductor in the winding, for example that of the copper conductor, with about 1 ohm.

In some embodiments, an apparatus 3 for voltage equalization is producible at very low cost, i.e. for example by spray-coating a plastic substrate. This apparatus 3 may be integrated independently of variance as a circuit board in the terminal board or terminal box of an electric motor.

Selection of the filler particle fractions allows stepless adaptation to the particular operating voltages and operating frequencies. This may be achieved by a simple lacquer which contains a particulate partially conductive network and which is—for example—amenable to simple spray application.

Various embodiments of the teachings herein include an apparatus for voltage equalization which is simple and variably adaptable to the particular electric motor, wherein the embedding of partially conductive filler particles in the form of one or more filler fractions in a matrix produces a partially conductive bridge and the polymeric and/or ceramic matrix for embedding with or without a substrate may be freely selected and is therefore optimally adaptable to the particular profile of requirements.

What is claimed is:

1. An apparatus for voltage equalization in square-wave voltages of electric motors, the apparatus comprising:
   a terminal board circuit wherein phases U, V, and W each comprises input and output cabled conductors summing to at least 6 cables; and
   a bridge between two of the at least six cables connecting two or more of the at least 6 cable inputs and outputs;
   wherein the bridge is partially conductive such that its electrical resistance markedly reduces above a threshold value;
   wherein the partial conductivity results from filler particles in an embedding matrix determining a reduction of the resistance in the bridge above the threshold value.

2. The apparatus as claimed in claim 1, wherein the filler particles are embedded in a polymeric and/or ceramic matrix.

3. The apparatus as claimed in claim 1, wherein at least some of the filler particles have a partially conductive coating.

4. The apparatus as claimed in claim 3, wherein the partially conductive coating comprises a doped material.

5. The apparatus as claimed in claim 3, wherein a thickness of the partially conductive coating of the filler particles is in a range from 10 nm to 100 nm.

6. The apparatus as claimed in claim 1, wherein at least one fraction of the filler particles comprises hollow filler particles having a partially conductive coating.

7. The apparatus as claimed in claim 1, further comprising a substrate including wood, pressboard, plastic, epoxy resin, polysiloxane, thermoplastic, fiber-reinforced plastic, ceramic, and/or leather, and carrying the embedding matrix and filler particles.

8. The apparatus as claimed in claim 7, further comprising a lacquer applied to the substrate in a film thickness in a range between 10 μm and 3 mm.

9. The apparatus as claimed in claim 1, wherein the embedding matrix comprises a lacquer with the filler particles.

10. The apparatus as claimed in claim 9, wherein the lacquer comprises a resin or a resin mixture with a compound selected from the group consisting of: epoxy resin, polyetherimide, polysiloxane, and polysilazane.

11. The apparatus as claimed in claim 1, wherein the filler particles comprise at least one material selected from the group consisting of: a metal oxide, a metal carbide, and a metal nitride.

12. The apparatus as claimed in claim 11, wherein the filler particles comprise an oxide and/or a carbide including at least one element selected from the group consisting of: tin, zinc, iron, molybdenum, bismuth, lead, chromium, manganese, nickel, cobalt, titanium, vanadium, indium, zirconium, tungsten, silicon, antimony, tellurium, and germanium.

13. The apparatus as claimed in claim 1, wherein the filler particles are present in the embedding matrix in a concentration of 0.5% by volume to 30% by volume.

14. The apparatus as claimed in claim 1, wherein the filler particles have a size in a range from 500 nm to 50 μm.

15. The apparatus as claimed in claim 1, wherein the filler includes two or more filler fractions.

* * * * *